United States Patent [19]
Holly et al.

[11] 4,118,831
[45] Oct. 10, 1978

[54] MOLDING DEVICE

[75] Inventors: James A. Holly, Richton Park, Ill.;
Harry H. Holly, Boca Raton, Fla.

[73] Assignee: Hollymatic Corporation, Park Forest, Ill.

[21] Appl. No.: 822,222

[22] Filed: Aug. 1, 1977

[51] Int. Cl.² ............................................. A22C 7/00
[52] U.S. Cl. ....................................... 17/32; 425/256
[58] Field of Search ...................... 17/32, 45; 425/239, 425/256

[56] References Cited
U.S. PATENT DOCUMENTS 3,203,037  8/1965  Anhanger et al. ........................ 17/32

Primary Examiner—Travis S. McGehee
Attorney, Agent, or Firm—Wegner, Stellman, McCord, Wiles & Wood

[57] ABSTRACT

A device and method for molding food articles of raw finely divided beef and similar tissue containing food material that is normally subject to uneven shrinkage during cooking comprising supply means for the material, a mold having a mold opening to form the articles and means for projecting the material under pressure across the mold opening from one edge thereof to fill the mold opening with pressurized material and shape said article.

12 Claims, 7 Drawing Figures

MOLDING DEVICE

CROSS-REFERENCE TO RELATED APPLICATION

The molding device of this invention is illustrated in conjunction with a patty machine for making shaped patties of ground raw beef and similar materials of the type disclosed in copending application Ser. No. 833,899, filed Sept. 16, 1977, and assigned to the assignee hereof.

BACKGROUND OF THE INVENTION

This invention relates to a food molding machine particularly for molding flat patties of ground raw beef and similar tissue containing material that tends to cook to a misshapen form. With many of these prior machines the raw patty has an attractive shape but upon cooking becomes misshapen because of the uneven shrinking of the tissues of the meat and particularly raw beef and, when cooked, has an unattractive texture and flavor. The present invention avoids these difficulties.

SUMMARY OF THE INVENTION

This invention provides a molding device and method in which the pressurized meat is projected from one edge of a mold opening or shaping cavity.

The result is that the shaped articles such as the flat patties, and particularly those of ground beef, cook quite rapidly which is reflected in considerable savings particularly when many hamburgers, for example, are served. Also, the shaped patty, after removal, has the same thickness as the mold opening.

Patties prepared according to this invention require less meat to produce the same size patty which cooks faster, tastes better and has a better appearance; or with the same amount of meat it is possible to produce a larger patty than the ones produced with the presently available machines so that the appearance is of more meat in a given patty when actually the amount of meat is no greater than that customarily used.

To summarize, therefore, the patties produced with the devices of this invention have substantially no shrinkage after cooking, regardless of the amount of meat in the patty or the thickness or overall area of the patty. In fact, patties have repeatedly been prepared with the device and method of this invention, cooked and then fitted precisely into the mold opening in which they were shaped with substantially no loss of transverse area so that the peripheral edge of the cooked patty is substantially the same in area and shape as the area defined by the edge of the mold opening.

Furthermore, the cooked patties are absolutely flat and cook evenly without crusty surfaces. Also, much less cooking time is required for the reasons given above and the cooked patties retain more moisture and juices so that they feel and are heavier after cooking. They have a much better texture and flavor.

The top and bottom surfaces of the cooked patties are not excessively overcooked even when the center of the patty is cooked to a well done consistency. There is more flavor due to more juice retention. They are more tender when bittin into since the top and bottom boundary layers of the patties are not flattened, stretched or smeared together. Furthermore, no matter what the shape of the mold opening, whether round, square, oval, chop or any other shape, the molded patties and more especially the cooked patties follow this shape exactly. Also, during cooking of the patties there is no "cupping". There is substantially no swelling or juice entrapment in pockets in the patty because the heat and juices can easily pass through the surface layers to retain just the right amount of juice in a cooked patty.

DESCRIPTION OF THE PREFERRED EMBODIMENT

The actual device, except for the mold plate and the filling arrangement, is similar to that disclosed and claimed in the above-identified copending application.

Figure 1:
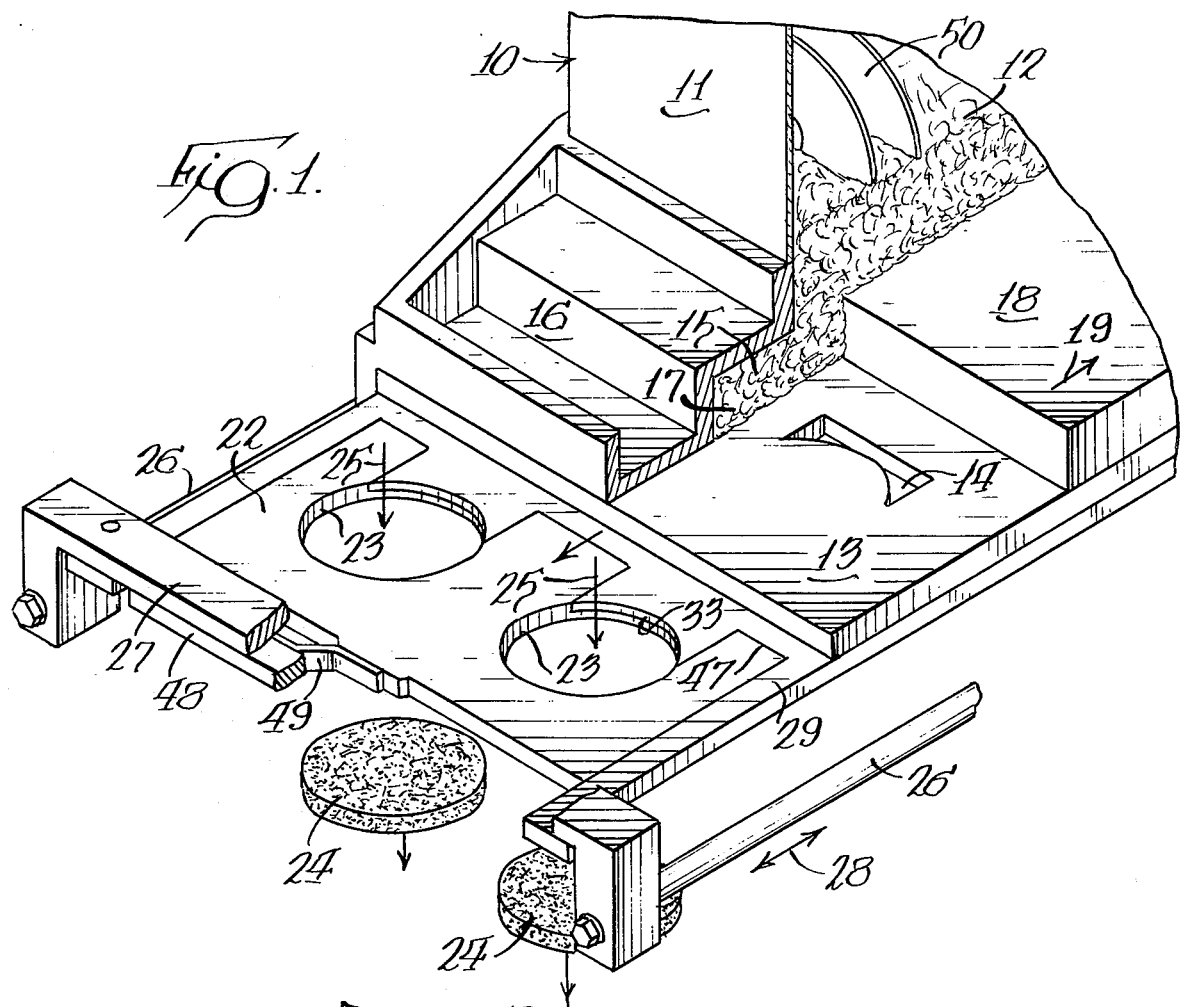
FIG. 1 is a fragmentary perspective view partially broken away of a two patty hamburger molding device with a mold plate in projected patty removal position.
Figure 3:
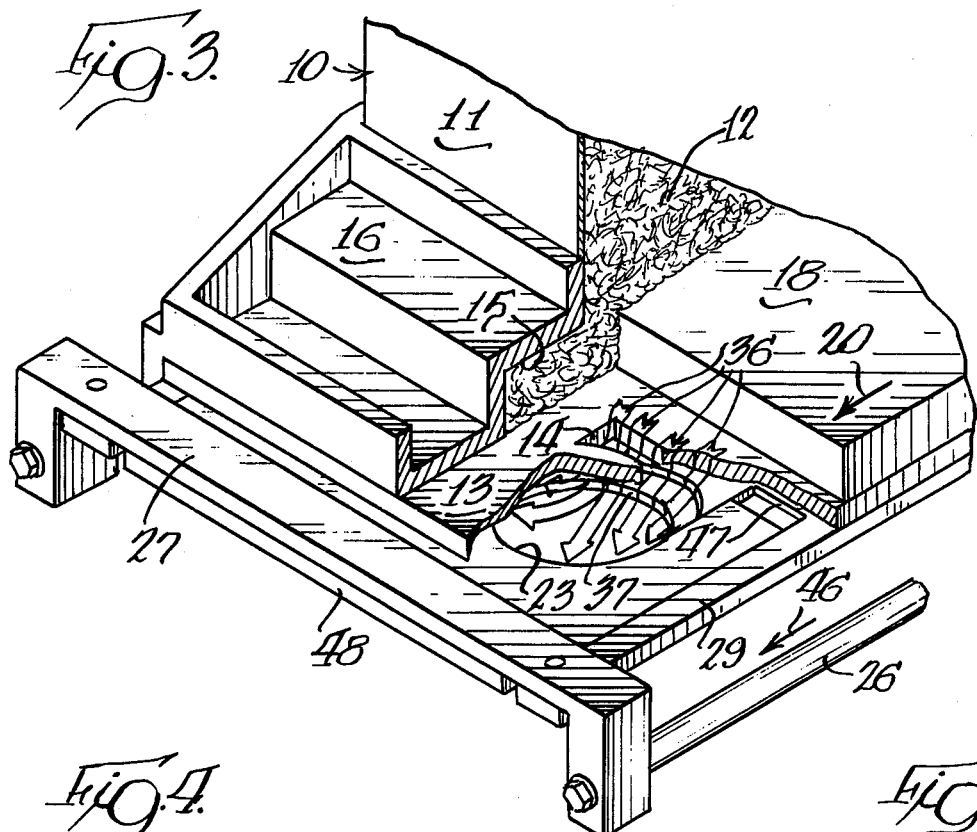
FIG. 3 is a view similar to FIGS. 1 and 2 but showing the parts in retracted position and illustrating schematically the filling of one of the pair of mold openings with the food material.

The device 10 comprises a hopper 11 for retaining the food material 12, here illustrated as ground raw beef with the hopper having a bottom fill plate 13 having a pair of fill openings of which only one is shown in FIGS. 1 and 3. This fill plate 13 defines the bottom 14 of the hopper 11 as well as the bottom of a pressure chamber 15. The pressure applying portion of this chamber is defined by a relatively heavy wall 16 at the front end of the device 10.

As is shown in FIG. 1 the food material 12 is moved toward the pressure chamber 14 by a pair of counterrotating side-by-side augers 50 which are turned in unison in increments as explained in the above copending application to keep the pressure chamber 15 filled with a material supply 17.

Figure 2:
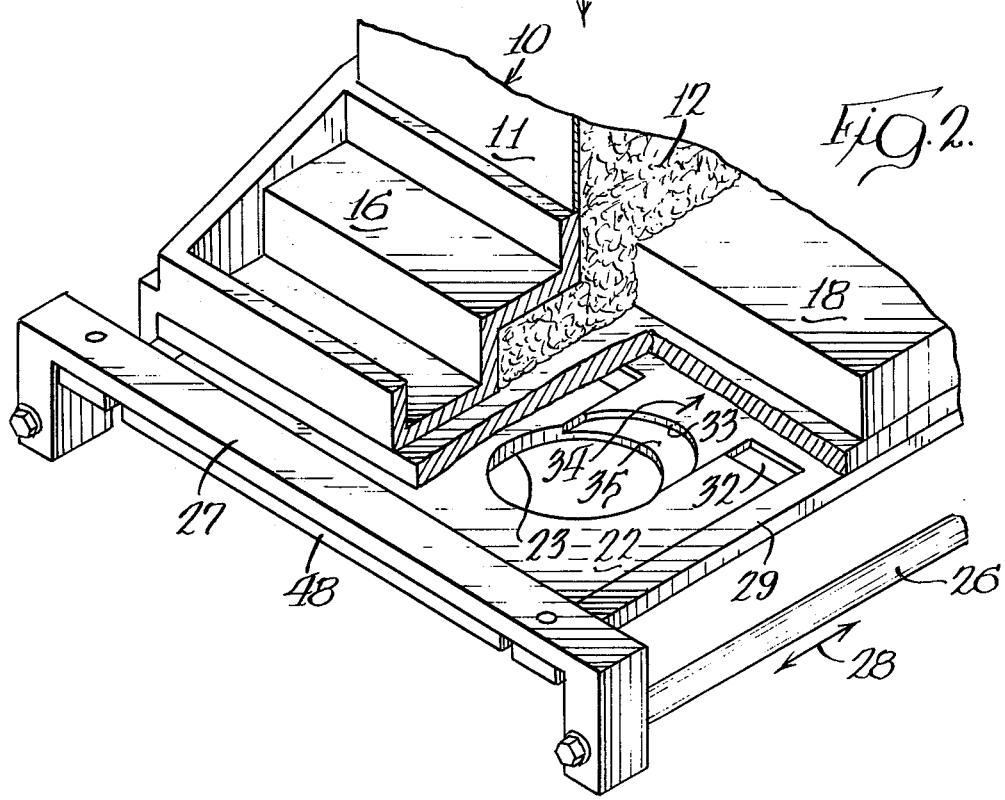
FIG. 2 is a view similar to FIG. 1 but showing the movable parts being retracted from the position of FIG. 1.

Reciprocably mounted on the top of the fill plate 13 is a pressure applying ram 18. The ram 18 is adapted to be moved away from the fill openings or slots 14 preparatory to the next pressure stroke in the manner illustrated by the arrow 19 of FIG. 1. The ram is also movable toward the fill openings to supply pressurized material through the openings as illustrated by the arrow 20 of FIG. 3. When the parts are in the position of FIG. 2 the ram 18 is stationary preparatory to the next pressure forward stroke 20.

Mounted beneath the fill plate 13 is a mold plate 22 having a pair of side-by-side mold openings 23 for shaping flat patties 24. These patties are shown directly after their removal from the mold openings with this removal being by any mechanism desired and is illustrated by the vertical arrows 25.

The mold plate is reciprocated between the projected patty removal position of FIG. 1 and the retracted filling position of FIG. 3 by a drive comprising side drive rods 26 that are substantially parallel to each other and a cross bar 27 connecting the forward ends of these rods 26. The cross bar 27 is reciprocated backwards and forwards as illustrated by the arrow 28 and drives the mold plate 22 forwardly by means of being connected to a mold cover plate 29. This cover plate is only a fraction as thick as the mold plate 22 where it overlies the mold plate in a recessed top surface portion of the mold plate. This cover plate in the illustrated embodiment is only about one-half as thick as is the mold plate 22 and has a curved forward edge 33.

The cover plate 29 when moved rearwardly 34 (FIG. 2) toward the position of FIG. 3 exposes the top surface portion 35 of the mold plate which is a part of the recessed surface portion 32. When the cover plate 29 and the mold plate 22 are in this recessed position with the surface portion 35 exposed the rear of each surface portion communicates with a fill opening 14 as illustrated in FIG. 3. Then the advancing 20 ram 18 forces the meat, illustrated by the arrows 36 of FIG. 3, into the corresponding mold opening 23 at the adjacent edge portion 37 of the mold opening.

Figures 4, 5:
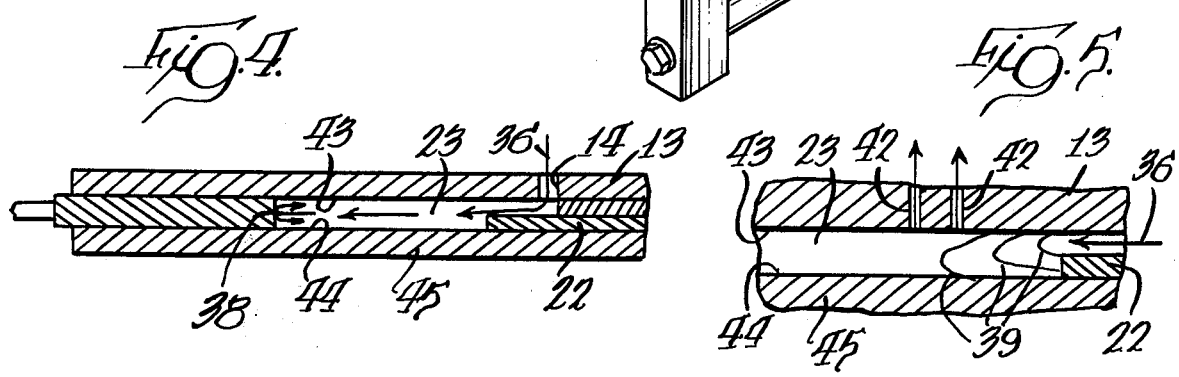
FIG. 4 is a fragmentary sectional view illustrating the filling of the mold opening with the food material when the parts are in the position of FIG. 3.
FIG. 5 is a view similar to a portion of FIG. 4, but enlarged, and illustrating what appears to be the pattern of the entering food material.

As is illustrated semi-schematically in FIGS. 4 and 5 this entering ribbon of meat 36 is only a fraction of the thickness of the mold opening 23 upon entering and moving toward the opposite edge 38 of the mold opening. The invention is not bound by any theory expressed herein. It is believed that the entering meat is in the form of successive waves as illustrated at 39 in FIG. 5 pushing the air ahead of it which can be released through customary air holes illustrated schematically at 42.

Figure 7:
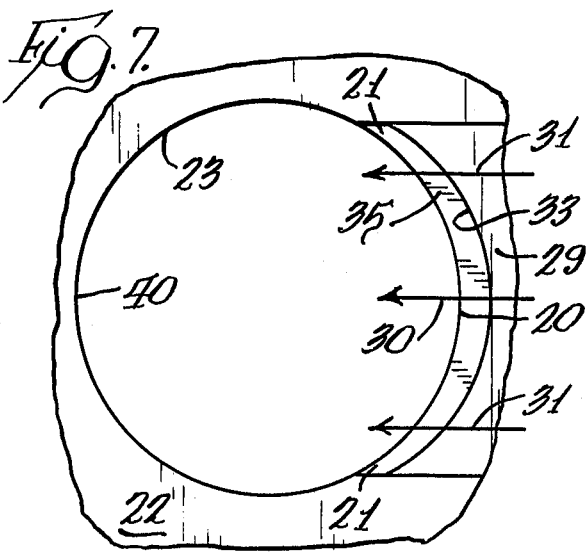
FIG. 7 is a fragmentary plan view of the mold plate and adjacent portion of the molding device.

As is shown in FIG. 7 the curved forward edge 33 of the mold cover plate 29 that forms a part of the flow passage for the entering meat 36 has a curvature that is greater than the curvature of the mold opening 23, that is, the edge 33 is curved on a larger radius than is the edge of the mold opening. In one example of this the center 20 of the meat flow passage was provided by spacing the center of the edge 33 only about 1/16 inch from the adjacent edge of the mold opening 23. This distance is, of course, shown exaggerated in FIG. 7. Then the sides 21 were spaced about ⅜ inch.

The reason for this was to provide a greater frictional drag on the meat 36 at the sides 21 than at the center 20 so that the center meat flow 30 would reach the opposite wall portion 40 at substantially the same time as the side meat flow 31. This was found to be desirable in producing a uniform patty.

As stated above, the fill plate 13 defines the bottom of the hopper 11 and the pressure chamber 15 and contains the fill openings 14. Opposite to this fill plate 13 is a base plate 45 with the surfaces of these plates 13 and 45 defining the surfaces 43 and 44 and also providing parallel surfaces between which the mold plate 22 reciprocates.

Once the mold openings 23 have been filled in the manner defined above the drive rods 26 are moved forwardly 46. This slides the cover plate 29 forwardly along the top of the recess 32 in the mold plate 22 to close these recesses by abutting the edges 47 against the edges 40 (FIG. 3). Here the curved edge 33 will project slightly into the mold opening 23 but without any harmful effect. In this position the transverse edge portions 47 and 40 of the cover plate and the mold plate are in contact so that further forward movement 46 of the drive rods 26 projects the parts to the position shown in FIG. 1.

Mounted on the bottom of the cross bar 27 is a mold plate bar 48 substantially coinciding therewith except for a shorter length and with this mold plate bar being provided with a mold plate return spring 49. This spring permits enough movement between the cover plate 29 and the mold plate 22 to define the top surface portion 35 over which the entering ribbon of meat 36 flows.

Figure 6:
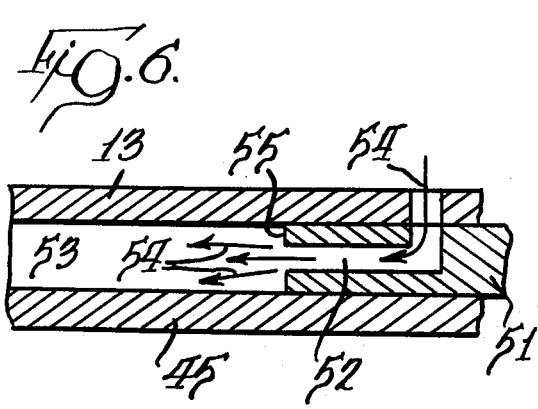
FIG. 6 is a view similar to FIG. 5 but showing another embodiment.

FIG. 6 illustrates a further embodiment in which the fill plate 13 and the base plate 45 are the same as in the previous embodiment but the mold plate 51 is provided with a meat flow opening 52 that supplies meat to the mold opening 53 at about the center as illustrated by the arrows 54. This center is of course at the edge 55 that defines the edge of the mold opening 53.

We claim:

1. A device for molding food articles of raw finely divided beef and similar tissue containing food material that is normally subject to uneven shrinkade during cooking, comprising: supply means for said material; a mold having a mold opening including a peripheral edge; a supply passage means for supplying pressurized said material to said mold opening when said mold is in a mold filling position to form said articles, said passage having an exit at one edge of said mold opening of substantial width and a thickness that is a fraction of the thickness of said mold opening at said edge to project a thin ribbon of said food material into the mold opening for filling said opening with said pressurized material; a closure for said exit having a width substantially equal to the width of said exit at the mold opening; and means for movably mounting said closure on said mold plate for movement between a forward position defining a portion only of said mold opening and a retracted position defining said exit.

2. The device of claim 1 wherein said supply passage exit has a said thickness approximately one-half of the thickness of the mold opening.

3. The device of claim 1 wherein said supply passage exit has a width slightly less than the maximum transverse width of said mold opening in the region adjacent to said passage exit.

4. The device of claim 1 wherein means are provided for mounting said mold for movement relative to the said device between said mold filling position and a projected position where said mold opening is exposed for removal of the molded article therefrom.

5. The device of claim 1 wherein said supply passage exit has a said thickness approximately one-half of the thickness of the mold opening and said supply passage exit has a width slightly less than the maximum transverse width of said mold opening in the region adjacent to said passage exit.

6. A device for molding food articles of raw finely divided beef and similar tissue containing food material that is normally subject to uneven shrinkage during cooking, comprising: supply means for said material; a mold having a mold opening including a peripheral edge; and a supply passage means for supplying pressurized said material to said mold opening when said mold is in a mold filling position to form said articles, said passage having an exit at one edge of said mold opening of substantial width and a thickness that is a fraction of the thickness of said mold opening at said edge to project a thin ribbon of said food material into the mold opening for filling said opening with said pressurized material, said mold comprising a mold plate having two superimposed parts having cooperating openings and peripheral edges together defining said mold opening and its said edge, one of said parts being of smaller area than the other, and there are provided means for moving said one of said parts relative to the other to a cooperating and coinciding position for determining said mold opening and to a relatively retracted position of the openings and edges of said one part relative to the other to define said supply passage.

7. The device of claim 6 wherein said parts comprise a bottom mold plate part having the mold opening therethrough and a top retractable part slidable thereon.

8. The device of claim 7 wherein said parts, when said bottom part is retracted, define said passage exit by the space between said opening in said top part and the upper surface of said bottom part.

9. The device of claim 6 wherein means are provided for mounting said mold for movement relative to the said device between said mold filling position and a projected position where said mold opening is exposed for removal of the molded article therefrom and wherein said parts, when said bottom part is retracted, define said passage exit by the space between said opening in said top part and the upper surface of said bottom part.

10. A device for molding food articles of raw finely divided beef and similar tissue containing food material that is normally subject to uneven shrinkage during cooking, comprising: supply means for said material; a mold having a mold opening including a peripheral edge; and a supply passage means for supplying pressurized said material to said mold opening when said mold is in a mold filling position to form said articles, said passage having an exit at one edge of said mold opening of substantial width and a thickness that is a fraction of the thickness of said mold opening at said edge to project a thin ribbon of said food material into the mold opening for filling said opening with said pressurized material, said mold comprising a mold plate having two superimposed parts having cooperating openings and peripheral edges together defining said mold opening and its said edge, one of said parts being of smaller area than the other, and there are provided means for moving said one of said parts relative to the other to a cooperating and coinciding position for determining said mold opening and to a relatively retracted position of the openings and edges of said one part relative to the other to define said supply passage, said parts comprising a bottom mold plate part having the mold opening therethrough and a top retractable part slidable thereon.

11. A device for molding food articles of raw finely divided beef and similar tissue containing food material that is normally subject to uneven shrinkage during cooking, comprising: supply means for said material; a mold having a mold opening including a peripheral edge; and a supply passage means for supplying pressurized said material to said mold opening when said mold is in a mold filling position to form said articles, said passage having an exit at one edge of said mold opening of substantial width and a thickness that is a fraction of the thickness of said mold opening at said edge to project a thin ribbon of said food material into the mold opening for filling said opening with said pressurized material, said supply passage exit having a said thickness approximately one-half of the thickness of the mold opening and located intermediate the top and bottom of the mold opening.

12. A device for molding food articles of raw finely divided beef and similar tissue containing food material that is normally subject to uneven shrinkage during cooking, comprising: supply means for said material; a mold having a mold opening including a peripheral edge; a supply passage means for supplying pressurized said material to said mold opening when said mold is in a mold filling position to form said articles, said passage having an exit at one edge of said mold opening of substantial width and a thickness that is a fraction of the thickness of said mold opening at said edge to project a thin ribbon of said food material across and into the mold opening for filling said opening with said pressurized material, said mold opening having a curved periphery adjacent to said supply passage and said supply passage exit having a curvature adjacent to said mold opening that substantially coincides with the curvature of said mold opening; and a closure for said exit having a curvature adjacent to said mold opening that is greater than the curvature of the corresponding adjacent portion of said mold opening peripheral edge.

* * * * *

UNITED STATES PATENT AND TRADEMARK OFFICE
CERTIFICATE OF CORRECTION

PATENT NO. : 4,118,831
DATED : October 10, 1978
INVENTOR(S) : James A. Holly et al It is certified that error appears in the above-identified patent and that said Letters Patent are hereby corrected as shown below:

Column 2, line 38, cancel "14"
         line 40, cancel "applying"
         line 44, cancel "14" and insert --15--

Column 3, line 32, cancel "7" and insert --3--;
                same line, cancel "33"
         lines 33-34, cancel "the mold cover plate 29 that forms a part of the flow passage for the entering meat 36" and insert --each fill opening 14 in the fill plate 13, serving as a closure for the supply passage exit (Fig. 4), --
         line 36, before "edge" insert --forward--;
                same line, cancel "33"
         line 39, cancel "edge 33" and insert --opening 14--
         line 41, cancel "7" and insert --3--
         line 42, cancel "sides 21" and insert --ends of the opening 14--
         line 44, after "21" insert --of the meat supply flow 36--

Signed and Sealed this

Twenty-second Day of May 1979

[SEAL]

Attest:

RUTH C. MASON
Attesting Officer

DONALD W. BANNER
Commissioner of Patents and Trademarks